(12) United States Patent
Gilbert et al.

(10) Patent No.: US 7,089,461 B2
(45) Date of Patent: Aug. 8, 2006

(54) METHOD AND APPARATUS FOR ISOLATING UNCORRECTABLE ERRORS WHILE SYSTEM CONTINUES TO RUN

(75) Inventors: Douglas Ray Gilbert, Rochester, MN (US); Raymond Leslie Hicks, Rochester, MN (US); Wayne Lemmon, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/392,504

(22) Filed: Mar. 20, 2003

(65) Prior Publication Data

US 2004/0199830 A1    Oct. 7, 2004

(51) Int. Cl.
*G06F 11/00* (2006.01)
(52) U.S. Cl. .............................. 714/47; 714/48; 714/6; 714/52
(58) Field of Classification Search .................... 714/6, 714/48, 52
See application file for complete search history.

(56) References Cited

U.S. PATENT DOCUMENTS 5,339,408 A * 8/1994 Bruckert et al. ............... 714/11
6,560,725 B1 * 5/2003 Longwell et al. ............. 714/54

* cited by examiner

*Primary Examiner*—Robert Beausoliel
*Assistant Examiner*—Charles Ehne
(74) *Attorney, Agent, or Firm*—Joan Pennington

(57) ABSTRACT

A method, apparatus and computer program product are provided for implementing uncorrectable error isolation in a computer system while the system continues to run. A memory controller performs data fetching from a system memory, capturing error information, and responsive to detecting an uncorrectable error, generates a predefined attention to a service processor. The service processor utilizing a processor runtime diagnostic (PRD) program, reads the captured error data and identifies a memory extent with the uncorrectable error. Then the memory controller performs accelerated scrubbing of the identified memory extent with the uncorrectable error, capturing error information and responsive to a scrub correctable error threshold being exceeded, sends a predefined scrub threshold exceeded attention to the service processor. The service processor reads the captured error data and identifies a failed memory chip.

15 Claims, 3 Drawing Sheets

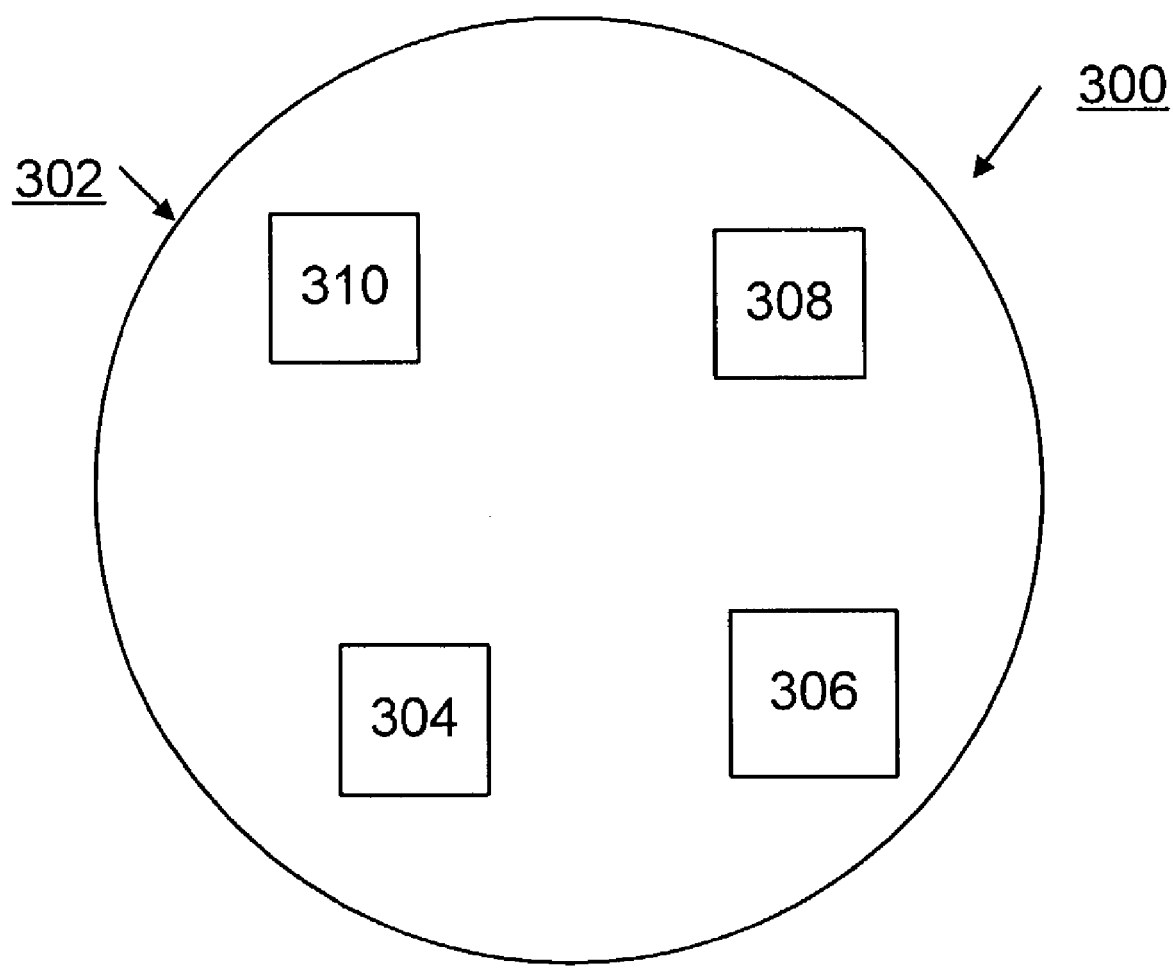

US 7,089,461 B2

METHOD AND APPARATUS FOR ISOLATING UNCORRECTABLE ERRORS WHILE SYSTEM CONTINUES TO RUN

FIELD OF THE INVENTION

The present invention relates generally to the data processing field, and more particularly, relates to a method, apparatus and computer program product for implementing uncorrectable error isolation in a memory system while the system continues to run.

DESCRIPTION OF THE RELATED ART

In an effort to minimize the effects of memory device failures, various error checking schemes have been developed to detect, and in some cases correct, errors in messages read from memory. Known error correction codes (ECCs) have been developed to detect and also to correct bits determined to be in error.

In a computer RAM memory system, typically data is stored in DRAMs mounted on multiple memory modules. The DRAMs store data in the form of electrical charges in semiconductor arrays. Data is stored in the DRAMs of the memory modules in the form, for example, of double words, each comprising 64 data bits and 8 error checking (ECC) bits making a total of 72 bits per double word. For example, data packets including 128 data bits and 16 ECC bits for a total of 144 bits per data packet may be stored in the DRAMs.

Known error correction codes (ECCs) utilize multiple error checking bits (ECC bits) or check bits stored with the data message in memory. Each check bit is a parity bit for a group of bits in the data message. When the message is read from memory, the parity of each group, including the check bit, is evaluated. If the parity is correct for all of the groups, this indicates that no detectable error has occurred. If one or more of the newly generated parity values are incorrect, a unique pattern called a syndrome results that typically is used to identify one bit or two bits in error. These syndrome bits are decoded to detect correctable and any uncorrectable errors. Upon detection of a particular single or double bit error, the error may be corrected by complementing the erroneous bits.

In some known computer memory systems upon the detection of an uncorrectable error, the system processor check stops. When the system processor check stops, the system processor stops processing and locks information into various system registers. Then to isolate the memory failure, the memory can be tested by reading and writing to memory while the memory is not being used. However, such memory testing typically cannot work when the system is continuing to run because of the danger of modifying customer data.

A need exists for an improved mechanism for uncorrectable error isolation in a computer memory system. It is desirable to implement the uncorrectable error isolation while the system continues to run and to identify a failed memory module or a particular failed dynamic random access memory (DRAM).

SUMMARY OF THE INVENTION

A principal object of the present invention is to provide a method, apparatus and computer program product for implementing uncorrectable error isolation in a computer system while the system continues to run. Other important objects of the present invention are to provide such method, apparatus and computer program product for implementing uncorrectable error isolation substantially without negative effect and that overcome many of the disadvantages of prior art arrangements.

In brief, a method, apparatus and computer program product are provided for implementing uncorrectable error isolation in a computer system while the system continues to run. A memory controller performs data fetching from a system memory, capturing error information, and responsive to detecting an uncorrectable error, generates a predefined attention to a service processor. The service processor utilizing a processor runtime diagnostic (PRD) program, reads the captured error data and identifies a memory extent with the uncorrectable error. Then the memory controller performs accelerated scrubbing of the identified memory extent with the uncorrectable error, capturing error information and responsive to a scrub correctable error threshold being exceeded, sends a predefined scrub threshold exceeded attention to the service processor. Then the service processor reads the captured error data and identifies a failed memory chip.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a block diagram illustrating a computer program product in accordance with the preferred embodiment.

DETAILED DESCRIPTION OF THE PREFERRED EMBODIMENTS

Figure 1:
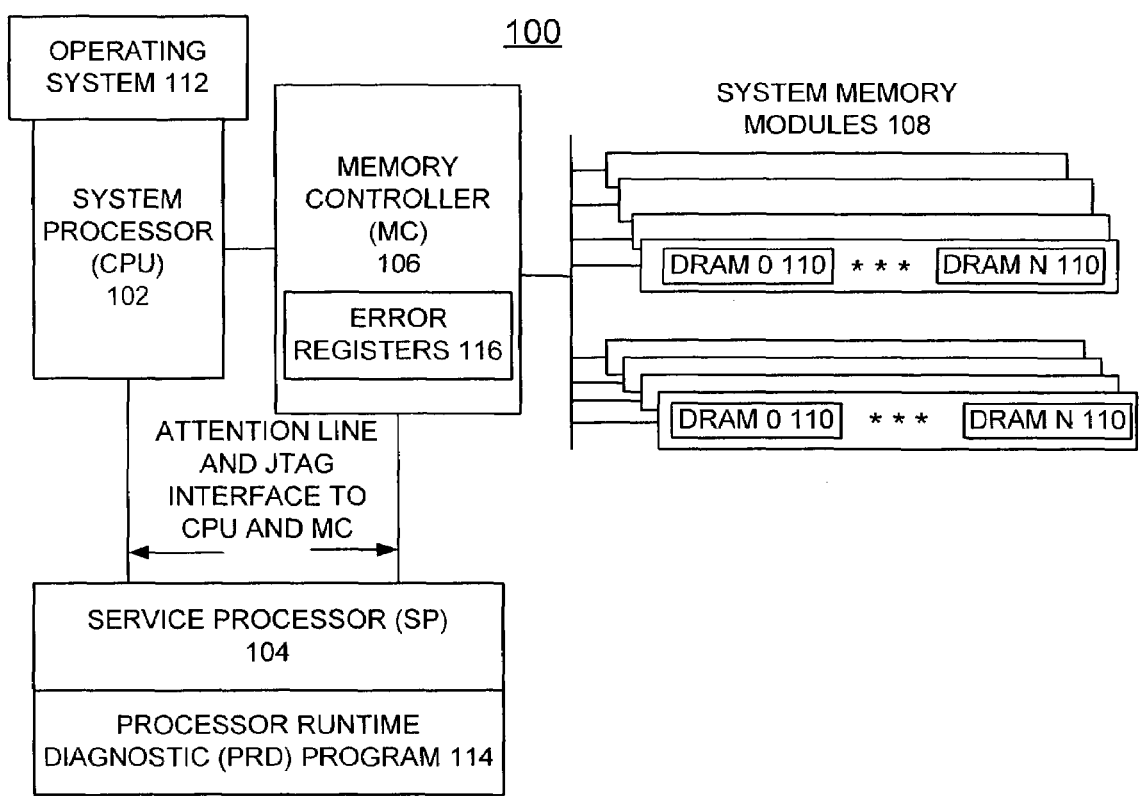
FIG. 1 is a block of a computer system in accordance with the preferred embodiment.

Having reference now to the drawings, in FIG. 1, there is shown a computer memory system generally designated by the reference character 100 for implementing uncorrectable error isolation in accordance with the preferred embodiment. System 100 includes a system central processor unit (CPU) 102 coupled to a service processor (SP) 104 and a memory controller (MC) 106.

As shown in FIG. 1, system 100 includes a plurality of system memory modules 108, for example, including multiple groups of four system memory modules 108. Each system memory module 108 includes a plurality of dynamic random access memories (DRAMs) 0-N 110. For example, each module 108 carries an array or group of eighteen DRAMs 110. System 100 includes an operating system 112, and a processor runtime diagnostic (PRD) program 114 in accordance with the preferred embodiment. A plurality of error registers 116 is associated with the memory controller (MC) 106, for example, internal to the memory controller.

Computer memory system 100 can be implemented with various commercially available computers, such as, a pSeries, RS/6000, iSeries, and AS/400, manufactured and sold by International Business Machines Corporation. Service processor 104 is suitably programmed by the processor runtime diagnostic (PRD) program 114 to execute the flowchart of FIG. 2.

Computer memory system 100 does not check stop on a memory uncorrectable error (UE), but handles the UE with a predefined error attention applied by the memory controller (MC) 106 to the service processor 104. An uncorrectable error is initially narrowed down to a chip select group, for example, to four system memory modules 108, then is isolated to a particular DRAM 110 in accordance with the preferred embodiment. The memory controller (MC) 106 performs a scrub of the system memory modules 108 and captures error information in the error registers 116 of the memory controller. The service processor 104 initiates the scrub operations or scrub functions. Information in the error registers 116 are retrieved and analyzed by the service processor 104.

In accordance with features of the preferred embodiment, uncorrectable error isolation is performed while the system 100 continues to run. The uncorrectable error is isolated to at least one Field Replaceable Unit (FRU), such as a particular system memory module 108. PRD 114 of the preferred embodiment is able to handle uncorrectable errors providing error isolation to a single memory module 108 and a single DRAM 110. PRD 114 could also improve the reliability of the system 100 by quickly identifying the bad DRAM 110 to be replaced and steering in a spare DRAM.

Figure 2:
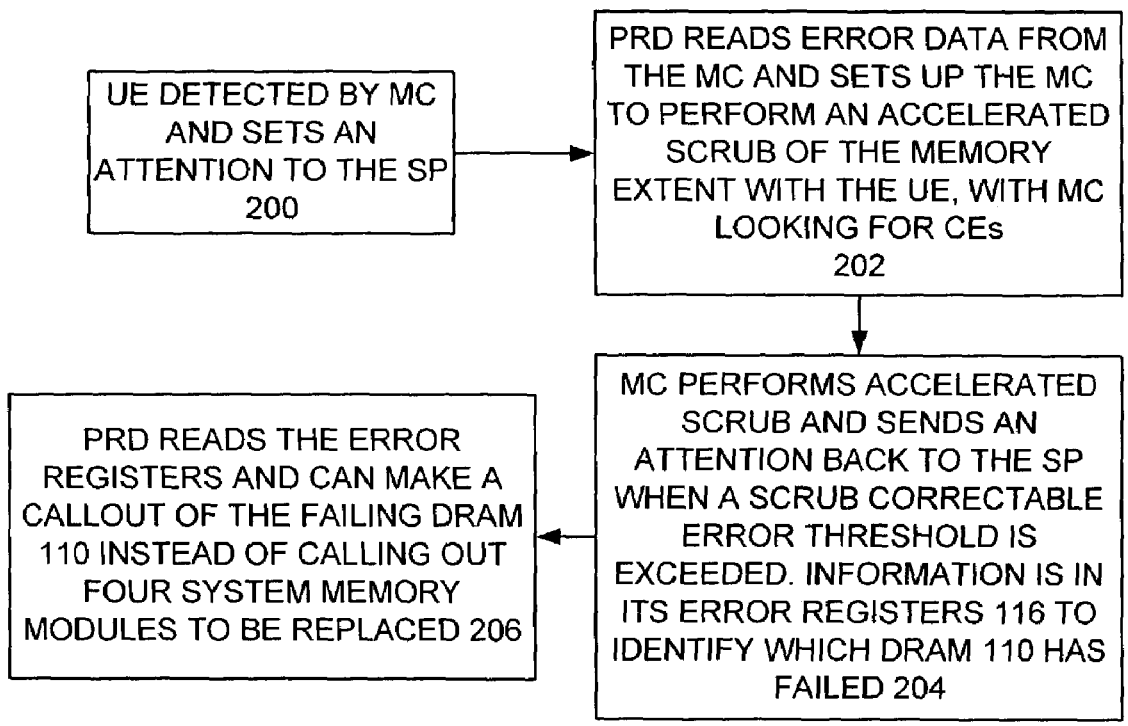
FIG. 2 is a flowchart illustrating exemplary steps for implementing uncorrectable error isolation while the computer system of FIG. 1 continues to run in accordance with the preferred embodiment.

Referring now to FIG. 2, there are shown exemplary steps for implementing uncorrectable error isolation while the computer system 100 continues to run in accordance with the preferred embodiment. The uncorrectable error isolation method of the preferred embodiment starts when the memory controller (MC) 106 detects an uncorrectable error while fetching data from the system memory modules 108. Data fetching could be for one of various reasons, such as, Processor Fetch, Instruction Fetch, DMA to I/O, or background scrubbing. Then memory controller (MC) 106 sets a predefined error attention to the service processor 104 as indicated in a block 200. An uncorrectable error typically is caused by a bad DRAM 110 and a single cell error in a different DRAM 110. The background scrubbing includes conventional operations of accessing memory locations in memory modules 108, reading data and checking data with ECC bits used to detect and correct correctable errors.

As indicated in a block 202, on receiving the predefined error attention that is an UE, PRD 114 retrieves the memory extent, such as, a group of memory modules 108 or chip select group of DRAMs 110 that had the uncorrectable error from information captured in the memory controller error registers 116. PRD code 114 reads the error information, stops the background scrubbing and resets the scrubbing registers 116 for the memory controller (MC) 106 to perform an accelerated scrub for the memory extent or chip select group of DRAMs 110 that had the error with the memory controller 106 checking for correctable errors.

In accordance with features of the preferred embodiment, the accelerated scrubbing detects the particular failing DRAM 110 by setting a scrub threshold exceeded bit in the memory controller (MC) 106 that causes a predefined scrub threshold exceeded attention to the service processor 104. PRD code 114 then makes the callout of the bad DRAM 110 which is mapped by PRD code from information in error registers 116. PRD code 114 then steers in the spare bit using a spare DRAM 110 as long as the spare bit in the spare DRAM is not used, to prevent any other single cell errors from causing an UE.

As indicated in a block 204, the accelerated scrubbing of the memory extent with the UE is carried out by the memory controller 106 and is executed in the background of the normal operation of system 100. During scrubbing, whenever the ECC bits of a data packet indicate a bit error has occurred, the error is corrected and a count corresponding to the bit position of the error is incremented by memory controller 106. When any of the bit position error counts exceed the predefined scrub threshold value, then the memory controller 106 sends the predefined scrub threshold exceeded attention to the service processor 104. Information in the error registers 116 of the memory controller (MC) 106 indicates the particular DRAM 110 that failed.

As indicated in a block 206, PRD 114 reads the error registers 116 and identifies the particular DRAM 110 that failed. Identifying the particular DRAM 110 that failed instead of calling out a group of four Field Replaceable Units (FRUs) or group of four memory modules 108 to be replaced enables improved reliability of system 100, for example, by steering in a spare DRAM 110.

In accordance with features of the preferred embodiment, only one FRU or memory module 108 needs to be replaced instead or four memory modules 108. Further uncorrectable errors (UEs) can be minimized by steering out the failed DRAM 110. When the FRU or memory module 108 is replaced, the FRU or memory module 108 can be reworked because the failed DRAM 110 is known.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing uncorrectable error isolation of the preferred embodiment in the system 100 of FIG. 1.

A sequence of program instructions or a logical assembly of one or more interrelated modules defined by the recorded program means 304, 306, 308, 310, direct the computer system 100 for implementing uncorrectable error isolation of the preferred embodiment.

While the present invention has been described with reference to the details of the embodiments of the invention shown in the drawing, these details are not intended to limit the scope of the invention as claimed in the appended claims.

What is claimed is:

1. A method for implementing uncorrectable error isolation in a computer memory system while the system continues to run, said method comprising the steps of:

utilizing a memory controller, performing data fetching from a system memory, capturing error information, and responsive to detecting an uncorrectable error, the computer memory system does not check stop and said memory controller generating a predefined attention to a service processor and the computer memory system continues to run;

said service processor responsive to said predefined attention, utilizing a processor runtime diagnostic (PRD) program, reading captured error data and identifying a memory extent with said uncorrectable error;

said memory controller responsive to said service processor for performing accelerated scrubbing of said identified memory extent with said uncorrectable error, capturing error information and responsive to a scrub correctable error threshold being exceeded, sending a predefined scrub threshold exceeded attention to the service processor while the computer memory system continues to run; and said service processor utilizing said processor runtime diagnostic (PRD) program, reading captured error data from said memory controller and identifying a failed memory chip while the computer memory system continues to run.

2. A method for implementing uncorrectable error isolation as recited in claim 1 wherein said service processor initiates said memory controller steps of performing accelerated scrubbing of said identified memory extent with said uncorrectable error, and capturing error information.

3. A method for implementing uncorrectable error isolation as recited in claim 1 wherein the step of capturing error information includes the step of said memory controller storing error information in error registers associated with said memory controller.

4. A method for implementing uncorrectable error isolation as recited in claim 1 wherein said stored error information in error registers associated with said memory controller is retrieved by said service processor for identifying said memory extent with said uncorrectable error and for identifying said failed memory chip.

5. A method for implementing uncorrectable error isolation as recited in claim 1 wherein said system memory includes a plurality of system memory modules, each system memory module including a plurality of memory chips.

6. A method for implementing uncorrectable error isolation as recited in claim 5 wherein said plurality of memory chips includes a plurality of dynamic random access memory chips (DRAMs).

7. Apparatus for implementing uncorrectable error isolation in a computer memory system while the system continues to run, said apparatus comprising:
 a system memory;
 a service processor for performing processor runtime diagnostic (PRD) program;
 a memory controller coupled to said service processor and said system memory; said memory controller performing data fetching from said system memory, capturing error information, detecting an uncorrectable error and the computer memory system does not check stop and said memory controller generating a predefined attention to said service processor responsive to said detected uncorrectable error and the computer memory system continues to run;
 said service processor responsive to said predefined attention, utilizing said processor runtime diagnostic (PRD) program, retrieving said captured error information from said memory controller and identifying a memory extent with said uncorrectable error;
 said memory controller responsive to said service processor for performing accelerated scrubbing of said identified memory extent with said uncorrectable error, capturing error information while the computer memory system continues to run, and responsive to a scrub correctable error threshold being exceeded, sending a predefined scrub threshold exceeded attention to the service processor; and
 said service processor utilizing said processor runtime diagnostic (PRD) program, reading captured error data from said memory controller and identifying a failed memory chip while the computer memory system continues to run.

8. Apparatus for implementing uncorrectable error isolation as recited in claim 7 wherein said memory controller includes error registers associated with said memory controller for storing error information.

9. Apparatus for implementing uncorrectable error isolation as recited in claim 7 wherein said system memory includes a plurality of system memory modules and each said system memory module includes a plurality of dynamic random access memories (DRAMs).

10. Apparatus for implementing uncorrectable error isolation as recited in claim 9 wherein said identified failed memory chip includes a single DRAM.

11. A computer program product for implementing uncorrectable error isolation in a computer memory system while the system continues to run, said computer program product including a plurality of computer executable instructions stored on a computer readable medium, wherein said instructions, when executed by the computer memory system, cause the computer memory system to perform the steps of:
 utilizing a memory controller for performing data fetching from a system memory, capturing error information, detecting an uncorrectable error and the computer memory system does not check stop and said memory controller generating a predefined attention to a service processor;
 said service processor responsive to said predefined attention, reading captured error data and identifying a memory extent with said uncorrectable error;
 said service processor initiating said memory controller for performing accelerated scrubbing of said identified memory extent with said uncorrectable error, capturing error information while the computer memory system continues to run; and responsive to a scrub correctable error threshold being exceeded, sending a predefined scrub threshold exceeded attention to said service processor; and
 said service processor responsive to said predefined scrub threshold exceeded attention, reading captured error data from said memory controller and identifying a failed memory chip while the computer memory system continues to run.

12. A computer program product for implementing uncorrectable error isolation in a computer memory system as recited in claim 11 wherein said system memory includes a plurality of system memory modules and each said system memory module includes a plurality of dynamic random access memories (DRAMs).

13. A computer program product for implementing uncorrectable error isolation in a computer memory system as recited in claim 12 wherein said identified memory extent includes a group of said system memory modules.

14. A computer program product for implementing uncorrectable error isolation in a computer memory system as recited in claim 12 wherein said identified memory extent includes a plurality of dynamic random access memories (DRAMs).

15. A computer program product for implementing uncorrectable error isolation in a computer memory system as recited in claim 12 wherein said identified failed memory chip includes a single DRAM of said plurality of dynamic random access memories (DRAMs).

* * * * *